United States Patent
Brown et al.

(10) Patent No.: US 9,237,506 B2
(45) Date of Patent: Jan. 12, 2016

(54) METHOD FOR IMPROVING PERFORMANCE AND REDUCING POWER CONSUMPTION OF A WIRELESS NETWORK ARRANGEMENT

(75) Inventors: Clym Brown, Cheshire (GB); Peter Alexander, Manchester (GB); Reuben Morgan, Manchester (GB)

(73) Assignee: TEXECOM LIMITED, Haslingden Lancashire (GB)

( * ) Notice: Subject to any disclaimer, the term of this patent is extended or adjusted under 35 U.S.C. 154(b) by 0 days.

(21) Appl. No.: 13/634,251

(22) PCT Filed: Apr. 4, 2012
(Under 37 CFR 1.47)

(86) PCT No.: PCT/EP2012/056180
§ 371 (c)(1),
(2), (4) Date: Oct. 21, 2014

(87) PCT Pub. No.: WO2013/017300
PCT Pub. Date: Feb. 7, 2013

(65) Prior Publication Data
US 2015/0050936 A1    Feb. 19, 2015

(30) Foreign Application Priority Data
Jul. 29, 2011    (GB) ..................................... 1113136

(51) Int. Cl.
*H04W 40/00*    (2009.01)
*H04W 40/02*    (2009.01)
(Continued)

(52) U.S. Cl.
CPC .............. *H04W 40/02* (2013.01); *H04W 40/22* (2013.01); *H04W 40/32* (2013.01); *H04W 52/0209* (2013.01); *Y02B 60/50* (2013.01)

(58) Field of Classification Search
CPC ............ H04W 36/0083; H04W 36/14; H04W 36/165; H04W 36/18; H04W 36/245; H04W 40/026; H04W 48/02; H04W 48/06; H04W 4/025; H04W 4/026; H04W 4/043; H04W 52/00; H04W 52/0258; H04W 52/0277; H04W 52/26; H04W 40/02; H04W 40/22; H04W 40/32; H04W 52/0209
USPC ............ 455/41.1, 436, 419, 41.2, 420, 432.1, 455/456.1, 456.3, 445; 370/311, 329, 235, 370/253, 328, 331, 217, 254, 312, 401
See application file for complete search history.

(56) References Cited

U.S. PATENT DOCUMENTS 6,791,949 B1 *  9/2004  Ryu et al. ...................... 370/254
7,522,540 B1     4/2009  Maufer
(Continued)

FOREIGN PATENT DOCUMENTS

EP    2323440 A1    5/2011
WO   2005006128 A2   1/2005

OTHER PUBLICATIONS

Congestion Avoidance and Load.Balancing m AODV-Multlpath using Queue Length Shalini Puri, IEEE, 2009.*

(Continued)

*Primary Examiner* — Inder Mehra
(74) *Attorney, Agent, or Firm* — Barlow, Josephs & Holmes, LTD.t

(57) ABSTRACT

A method of transmitting electronic signals for use with a wireless network arrangement comprising assimilating and storing data relating to successful communication routes within the network arrangement and the transmission and receiving of electronic signals between the minimum number of devices in wireless network arrangement to improve efficiency of data communication and to reduce the power consumption of the network.

13 Claims, 2 Drawing Sheets

(51) Int. Cl.
  *H04W 40/22*  (2009.01)
  *H04W 40/20*  (2009.01)
  *H04W 52/02*  (2009.01)
  *H04L 12/28*  (2006.01)
  *H04H 20/71*  (2008.01)
  *H04W 40/32*  (2009.01)

(56) References Cited

U.S. PATENT DOCUMENTS

| | | |
|---|---|---|
| 2004/0156384 A1 | 8/2004 | Rune et al. |
| 2010/0061272 A1* | 3/2010 | Veillette ............... 370/254 |
| 2010/0097969 A1* | 4/2010 | De Kimpe et al. ........... 370/311 |
| 2010/0157827 A1 | 6/2010 | Park et al. |
| 2010/0172291 A1* | 7/2010 | Kim et al. ............... 370/328 |
| 2013/0111038 A1* | 5/2013 | Girard ............... H04L 45/245 709/226 |
| 2015/0100172 A1* | 4/2015 | Forbes, Jr. ............... H02J 13/00 700/295 |

OTHER PUBLICATIONS

Boshoff, J.N. and Helberg, A.S.J., "Improving QoS for Real-Time Multimedia Traffic in AD-HOC Networks With Delay Aware Multi-Path Routing", IEEE 2008.

Toh, C. K., ANH-NGOC, L. and YOU-ZE, A., "Load Balanced Routing Protocols for AD HOC Mobile Wireless Networks", Topics in Ad Hoc and Sensor Networks, IEEE Communications Magazine, 2009.

Puri, S. and Devene, S. R., "Congestion Avoidance and Load Balancing in AODV-Multipath Using Queue Length", Second International conference on Emerging Trends in Engineering and Technology, ICETET 09.

Siinha, R, Krishnamurthy, S. V. and Dao, S., "Scalable Unidirectional Routing With Zone Routing Protocol(ZRP) Extensions for Mobile AD-HOC Networks", IEEE 2000.

* cited by examiner

METHOD FOR IMPROVING PERFORMANCE AND REDUCING POWER CONSUMPTION OF A WIRELESS NETWORK ARRANGEMENT

CROSS-REFERENCE TO RELATED APPLICATIONS

This patent document is a national phase application filed pursuant 35 U.S.C. §371 of PCT International Application No. PCT/EP2012/056180, filed on Apr. 4, 2012, which claims priority to earlier filed British Application No. GB 1113136.4, filed on Jul. 29, 2011.

BACKGROUND OF THE INVENTION

1. Field of the Invention

The present invention relates generally to a method for improving performance and reducing power consumption of a wireless network system and more specifically relates to a method for improving performance and reducing power consumption of a constantly supervised battery powered wireless mesh network system.

2. Background of the Related Art

Wireless mesh networks are known for their useful application in communicating information over a wide area, using a network of multiple nodes (devices) that are capable of sending and receiving data.

Generally, information is transmitted from a start point to an end point, both of which may be either a control panel or a device within the mesh network. In known mesh network arrangements, information may be passed via a number of devices between said start and end points, thus requiring that all devices within the mesh remain in an active state so that they are ready to send and receive messages upon demand.

It will be appreciated that the requirement to remain in a constantly active state is not only inefficient, but also consumes significant power. In particular, the power demands often mean that a battery powered mesh network arrangement is unfeasible, as the limitations of the battery life of each device would prevent such as mesh network from being constantly supervised (i.e. each component being in an active state).

SUMMARY OF THE INVENTION

Accordingly, it is an object of the present invention to improve the performance of a wireless mesh network arrangement so as to reduce power consumption of said network.

It is a further object of the present invention to reduce power consumption of a mesh network arrangement to the extent that a battery powered constantly supervised mesh network arrangement is viable.

Thus and in accordance with a first aspect of the present invention there is provided a method of transmitting electronic signals for use with a wireless network arrangement comprising assimilating and storing data indicating successful communication routes between devices and the transmission and receiving of electronic signals between the minimum number of devices in a wireless network arrangement, in accordance with the most efficient route as determined by previously successful communications.

Thus and in accordance with a second aspect of the present invention, there is provided a device operating in accordance with the features of the first aspect of the present invention, capable of; assimilating and storing data indicating successful communication routes between devices and the transmission and receiving of electronic signals between the minimum number of devices in a wireless network arrangement, in accordance with the most efficient route as determined by previously successful communications.

Preferably, the method for improving performance and reducing power consumption of a wireless mesh network arrangement, hereinafter referred to as "the method", is capable of being incorporated into an existing mesh network hardware arrangement, without the need for replacing hardware.

The method may also be capable of being incorporated into inter-operable system architecture including wireless and hardwired systems.

Most preferably, said method may provide an improved communication route between devices which may ultimately result in devices communicating via the minimum number of wireless connections necessary. For example, it may be possible for a communication route to be established using non-adjacent devices to avoid the need for every potential device along the route to participate in data communication, thus enabling devices to be "missed out" to establish a communication route using the minimum number of network devices necessary.

It will be appreciated that this improves the performance and reduces the power consumption of the wireless network arrangement by increasing the efficiency of data transfer.

Said improved communication route may be established using information including but not limited to signal strength, previously successful routes and device location data.

Most preferably, power consumed by mesh network systems incorporating said method, will be sufficiently low as to allow the system to be battery operated if required or desired.

To achieve a reduced level of power consumption, said method may include the possibility for each device to be in an active state for periodic intervals of time, rather than being in a continuously active state, thus reducing power requirements of the mesh network system.

To further reduce power consumption, said method may also allow devices not participating in information transmission to remain in an inactive state, thus reducing power requirements and, in battery operated systems; prolonging battery life of the devices.

Preferably, the method will allow for modifications to the mesh network arrangement, such as for example as a result of external factors including but not limited to environmental changes or changes in signal strength, to allow the mesh network arrangement to continually adapt to maintain optimal performance.

The method may apply a "zone" structure to the mesh network arrangement to divide said mesh network into respective areas to assist in the transmission of information across said mesh network using the minimum number of intermediate devices.

BRIEF DESCRIPTION OF THE DRAWINGS

The invention will now be described further by way of example only and with reference to the accompanying drawings in which.

DETAILED DESCRIPTION OF THE PREFERRED EMBODIMENT

Figure 1:
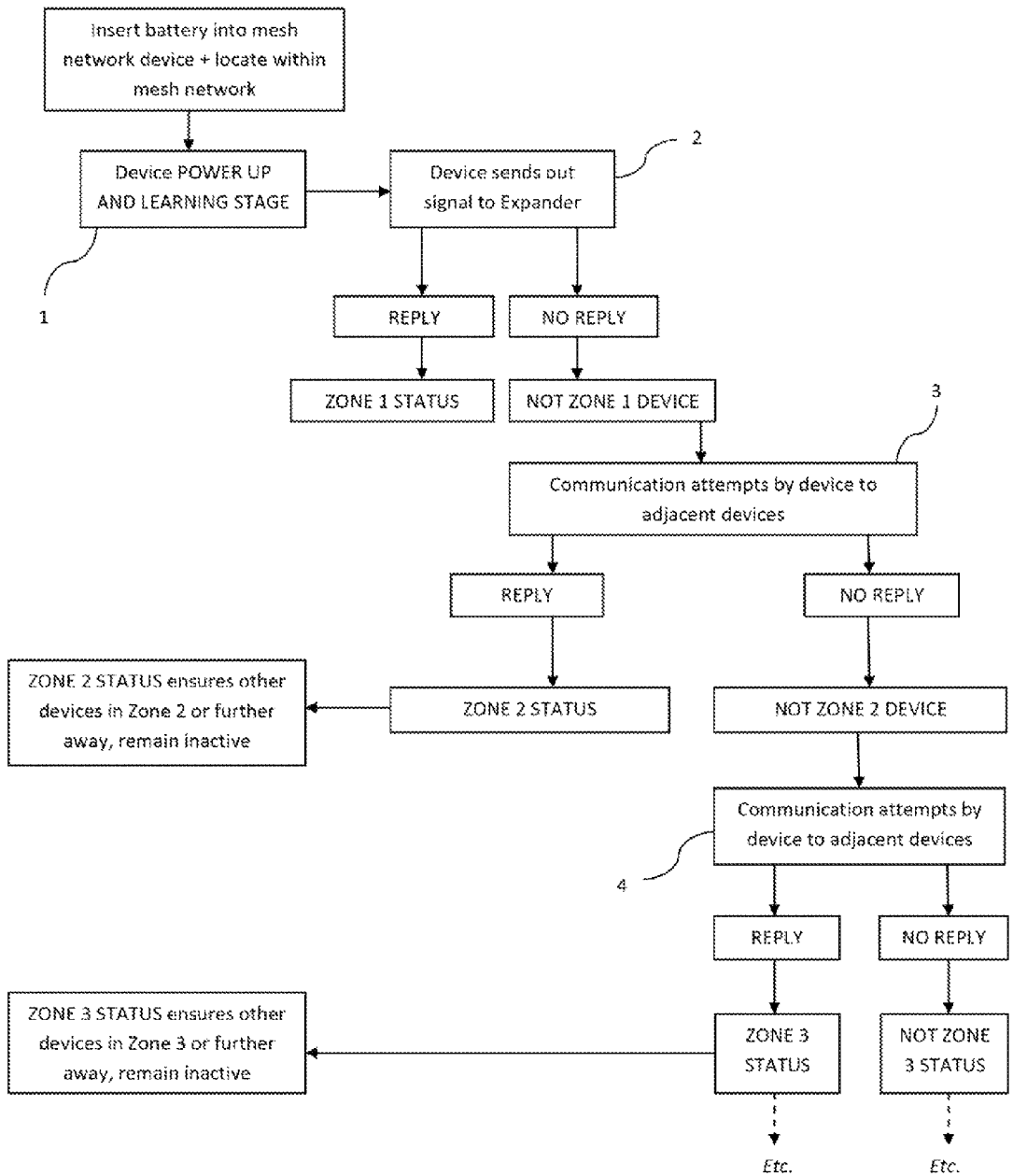
FIG. 1 shows a flow chart illustrating the method steps.

Referring now to FIG. 1 there is shown a flow chart illustrating the steps involved in the method of improving the performance and reducing the power consumption of a wireless mesh network.

A mesh network device is initially powered up by inserting a battery into said device. The device is then incorporated into a mesh network arrangement. In accordance with the first step of the method, the device is now in an active state and enters a "learning" phase during which it transmits an electronic message 2 to the Expander (mesh network control panel) 10 and waits for a reply from said Expander 10.

The purpose of this learning phase is to allow the device to locate its position within the mesh network arrangement. During this learning phase, message transmission occurs over a longer time period than post-learning phase, with a typical message duration lasting over 0.5 second.

If the device receives a message back from the Expander 10, said device is located within Zone 1 and accordingly recognises and stores this location information. The device is then designated as a Zone 1 device within the mesh network arrangement.

If the device does not receive a message back from the Expander 10, then said device establishes that it is not a Zone 1 device. In this instance, the device then attempts to communicate with adjacent devices by sending out a further message 3, to said adjacent devices and then awaits a reply.

If the device receives a reply from an adjacent device, then the device is located within Zone 2 and accordingly recognises and stores this location information. The device is then designated as a Zone 2 device within the mesh network arrangement.

Once a device has established itself as a Zone 2 device, this guarantees that all other Zone 2 devices or anything further away than Zone 2 will disregard the Zone 2 message and return to an inactive state, thus reducing power consumption.

If the device does not receive a message back from any adjacent devices, then said device establishes that it is not a Zone 2 device. In this instance, the device then attempts to communicate with further devices by sending out a message 4, to further adjacent devices and then awaits a reply.

If the device receives a reply from a further adjacent device, then the device is located within Zone 3 and accordingly recognises and stores this location information. The device is then designated as a Zone 3 device within the mesh network arrangement.

This process can be continued to allow devices to be located further away from the Expander, thus increasing the range of the mesh network arrangement.

Once a new device has established itself within a particular zone, this ensures that other devices within the same zone and other devices that are located further away from the Expander 10, automatically disregard the message being sent to the new device and return to an inactive state, thus reducing power consumption.

The method above effectively results in information being funneled from the devices back in towards the Expander 10, rather than being transmitted laterally across the mesh network arrangement and also ensures that only relevant devices are participating in the information channeling. The effect of this is that only the minimum number of wireless connections is required to transmit information between the devices and the Expander 10. This again, reduces power consumption of the devices within the mesh network.

Figure 2:
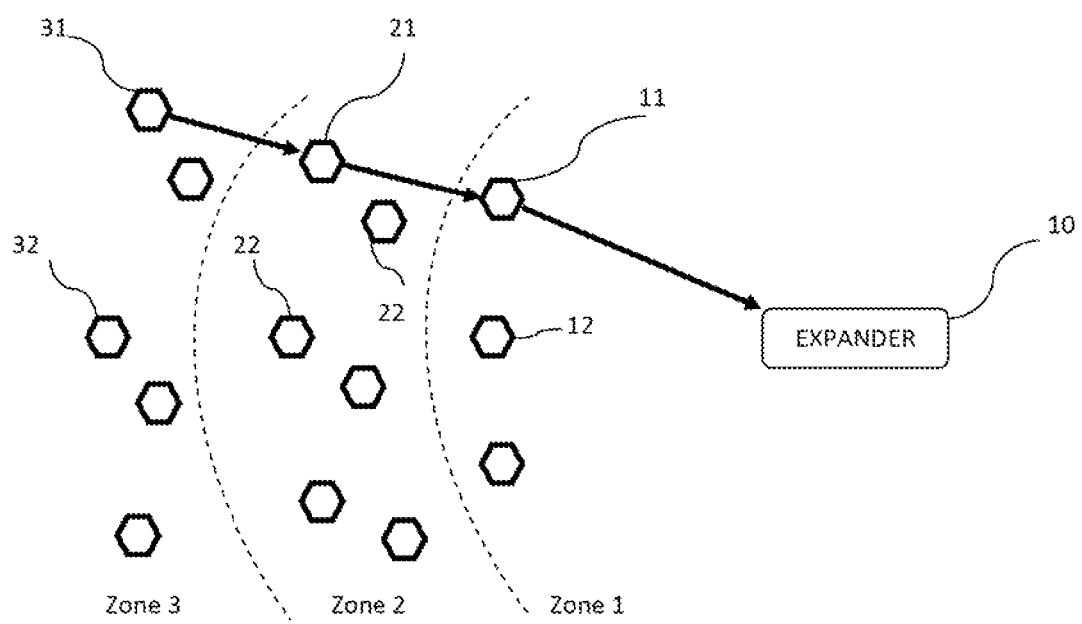
FIG. 2 shows the "funnelling" principle illustrating the route of transmission of information from the devices to the Expander (control panel).

Referring now to FIG. 2 there is shown an illustration of the "funnelling" principle showing the route of transmission of information from the devices to the Expander (control panel) 10.

The mesh network is arranged in a virtual "zone" configuration in which are located individual devices, capable of sending and receiving messages from adjacent devices. The zone boundaries are not specifically restricted to a finite distance but are determined by the strength of the wireless signal.

Devices automatically configure their location in accordance with the steps of the method outlined with reference to FIG. 1. The outermost device 31 in the mesh network then transmits information to the Expander 10 via intermediate devices 21, 11 in a funnelling-type manner, as illustrated in FIG. 2. This funnelling effect uses the minimum number of wireless communications necessary to transmit information between the device and the Expander 10, as information is channelled rather than being transmitted laterally across the mesh network.

As well as storing information about their specific location, devices within the mesh network are also able to compile, store and transmit routing information. Said routing information details the last successful route by which information was communicated between said device and said Expander 10. When said routing information is transmitted from the device to the Expander 10, the Expander 10 receives this information and transmits a response via the same pathway. Similarly, when devices attempt to transmit information, they will also use the last successful route as the first pathway of choice to reach the Expander 10.

This method of transmission of information reduces power consumption and increases efficiency of the mesh network arrangement by only utilising the minimum number of devices required to transmit information across the required distance. This effectively means that the mesh network is working in a similar manner to a point to point network, with the flexibility and back-up of the mesh network operational principle if the pre-established route is unsuccessful.

For example, if a Zone 3 device 31 attempts and fails to transmit a message to a Zone 2 device 21, the Zone 3 device 31 can attempt to transmit a message back to the Expander 10 via an alternative pathway, such as for example via an alternative Zone 2 device 22. Device 22 may then transmit the message to the Expander 10 via the alternative Zone 1 device 12. This demonstrates the flexibility and "self-healing" principle of the mesh network arrangement.

Similarly, alternative network devices, such as 23 may be "missed out" of a communication route if there is a more efficient route that employs fewer devices to successfully communicate data between the Expander 10 and a target device. The message is therefore capable of being transmitted by non-adjacent devices, thus "jumping over" other devices within the network arrangement, to create a communication route between the Expander 10 and target device using the minimum number of devices necessary to complete the route. This is achieved as devices are capable of selectively responding to messages in accordance with previously successful communications and also in response to changes in the network arrangement such as communication failures.

The new routing information is stored, subject to a satisfactory signal strength being obtained using the new route.

By storing previously successful routing information, the method applied to the mesh network arrangement allows devices to synchronise more effectively when switching between active and de-activated states, with synchronisation improving over time. This feature of the method creates a correction factor which can be applied to the mesh network arrangement to further improve its efficiency.

It is of course to be understood that the invention is not intended to be restricted to the details of embodiments described above which are described by way of example only.

The invention claimed is:

1. A method of transmitting electronic signals for use with a wireless network arrangement comprising assimilating and storing data indicating successful communication routes between devices and assimilating and storing data indicating the minimum number of devices in each communication route in a wireless network arrangement, identifying the most efficient communication route from said data for each communication route, configuring the devices in the wireless network arrangement into a zone arrangement wherein each device determines its zone by identifying the shortest communication route to the control panel from said data.

2. A method of transmitting electronic signals in accordance with claim 1, further comprising establishing communication route between non-adjacent devices located within the network arrangement, to transmit electronic signals between a first device and a target device using a minimum number of intervening network devices to relay the communication to the target device.

3. A method of transmitting electronic signals in accordance with claim 2, wherein a communication route comprises a single target device for receipt of the communication.

4. A method of transmitting electronic signals in accordance with claim 2, wherein a communication route comprises multiple target devices for receipt of the communication.

5. A method of transmitting electronic signals in accordance with claim 1 further comprising dividing the wireless network arrangement into zones wherein zone boundaries are not finite.

6. A method of transmitting electronic signals in accordance with claim 1 further comprising defining the zone boundaries by strength of the wireless signal.

7. A method of transmitting electronic signals in accordance with claim 1, further comprising establishing a communication route between a first device and a target device by transmitting electronic signals from the first device to the target device using the minimum number of intermediate network devices between the first device and the target device.

8. A method of transmitting electronic signals in accordance with claim 1, further comprising determining if a particular network device is part of a communication route of a particular network communication; and switching to an inactive mode to reduce power consumption of the network device in the wireless network arrangement if the particular network device is outside of the communication route of the particular network communication; and switching to an active mode if the particular network device is part of the communication route of the particular network communication.

9. A method of transmitting electronic signals in accordance with claim 1, wherein the method further comprises selectively enabling network devices to react to messages transmitted within the wireless network arrangement, wherein each device is selectively enabled according to said device's location within the network arrangement as determined by the stored data of communication routes.

10. A network device configured and arranged to transmit electronic signals in a wireless network arrangement, comprising: a battery configured and arranged to power the network device; a transmitter and a receiver configured and arranged to send and receive electronic signals within the wireless network arrangement; and electronics connected to the transmitter and received configured and arranged to assimilate and store data indicating successful communication routes between devices, the minimum number of devices in each communication route in the wireless network arrangement, and the most efficient communication route from said data for each communication route, said electronics further configured and arranged to calculate a zone for the network device by identifying the shortest communication route to the control panel from said data.

11. The network device according to claim 10 wherein the network device is configured and arranged to communicate with at least one non-adjacent device to establish a communication route between a first device to a target device using a minimum number of devices in the communication route.

12. The network device according to claim 10 wherein the network device is further configured and arranged to selectively participate in data communication to provide a communication route between a starting device and a target device, said route comprising a minimum number of intermediate network devices.

13. The network device according to claim 10 wherein the network device is further configured and arranged to switch to an inactive mode to reduce power consumption when not participating in signal communication and switch to an active mode when participating in a signal communication.

* * * * *